United States Patent [19]
Torregrosa et al.

[11] Patent Number: 4,768,877
[45] Date of Patent: Sep. 6, 1988

[54] METHOD AND DEVICE FOR MEASURING THE PROPAGATION TIME OF A WAVE

[75] Inventors: Michel Torregrosa, Portes Les Valence; Eric Margaillan, Gap, both of France

[73] Assignee: Crouzet, Paris, France

[21] Appl. No.: 866,279

[22] Filed: May 23, 1986

[30] Foreign Application Priority Data

May 29, 1985 [FR] France .................. 8508177

[51] Int. Cl.$^4$ .............................. G01C 3/08
[52] U.S. Cl. ...................... 356/5; 342/127; 342/145
[58] Field of Search ............. 356/3, 4, 5; 342/127, 342/145

[56] References Cited

U.S. PATENT DOCUMENTS

| | | | |
|---|---|---|---|
| 3,263,227 | 7/1966 | Ferry et al. | |
| 3,619,058 | 11/1971 | Hewlett et al. | 356/5 |
| 3,752,582 | 8/1973 | Troll et al. | 356/5 |
| 3,778,159 | 12/1973 | Hines et al. | 356/5 |
| 3,877,813 | 4/1975 | Hayes et al. | 356/5 |
| 3,900,259 | 8/1975 | Mott et al. | 356/5 |
| 4,150,377 | 4/1979 | Milov et al. | 342/125 |
| 4,229,102 | 10/1980 | Wiklund et al. | 356/5 |
| 4,241,995 | 12/1980 | Takahama | 356/5 |
| 4,274,736 | 6/1981 | Balmer | 356/5 |
| 4,355,899 | 10/1982 | Nussmeier | 356/5 |
| 4,413,904 | 11/1983 | Hamada et al. | 342/127 |
| 4,443,799 | 4/1984 | Rubin | |
| 4,533,242 | 8/1985 | McLaughlan et al. | 356/5 |

OTHER PUBLICATIONS

Hewlett Packard Journal vol. 31, No. 6, Jun. 1980, pp. 3–11, Palo Alto, US; D. E. Smith: "Electronic Distance Measurement for Industrial and Scientific Applications" FIG. 2; p. 3, L 1–p. 6, line 36.

Hewlett-Packard Journal, vol. 31, No. 9, Sep. 1980, pp. 3–11, Palo Alto, CA, US; A. F. Gort; "A Fully Integrated, Microprocessor-Controlled Total Station".

Primary Examiner—Stephen C. Buczinski
Assistant Examiner—Linda J. Wallace
Attorney, Agent, or Firm—Stevens, Davis, Miller & Mosher

[57] ABSTRACT

A method and device are provided for measuring the propagation time of a wave, wherein a wave is transmitted modulated in amplitude by a modulation signal. The wave reflected by an obstacle is received after a propagation time and the amplitude thereof is detected. The average value of the product of the detected signal and a reference signal is calculated and the delay with respect to the modulation signal is controlled so as to cancel out the average value. The modulation signal and the reference signal comprise a succession of elementary signals chosen so as to allow, in a single measurement, a long propagation time to be determined without ambiguity and with high accuracy.

4 Claims, 3 Drawing Sheets

METHOD AND DEVICE FOR MEASURING THE PROPAGATION TIME OF A WAVE

BACKGROUND OF THE INVENTION

1. Field of the Invention

The present invention relates first of all to a method for measuring the propagation time $\tau_t$ of a wave between a transmitter-receiver of said wave, and a reflecting obstacle, in which:

said wave is transmitted modulated in amplitude by means of a periodic modulation signal, the amplitude of said wave is detected after propagation, reflection and reception, for obtaining a detected signal, a periodic reference signal is generated of the same period as said modulation signal and phase shifted with respect thereto by a phase shift corresponding to a delay time $\tau$ the average value of the product of said detected signal and said reference signal is calculated, said phase shift is controlled so that said average value is zero, and said propagation time $\tau_t$ is calculated from the delay time $\tau$ thus obtained.

Such a process is used in telemetry or range finding, for determining the distance between the transmitter-receiver and the reflecting obstacle from the measured propagation time $\tau_t$ and the speed of the wave.

2. Description of the Prior Art

A method of the above type is already known, for example from the U.S. Pat. No. 3,752,582. In this patent the modulation signal is a sinusoidal signal of pulsation $\omega$ and the reference signal is formed by the modulation signal delayed by the delay time $\tau$. In this case, when $\tau$ corresponds to cancellation of the average value of the product of the detected signal and the delayed modulation signal, it is easy to show that we have:

$$\tau_t = \tau - \pi/2\omega + 2k\pi/\omega$$

where k is any integer.

To get over the indetermination of $2k\pi/\omega$ a pulsation $\omega$ of the transmitted signal is chosen so that the term $$2\pi/\omega$$

is greater than the maximum propagation time $(\tau_t)_{max}$ to be measured, namely:

$$2\pi/\omega > (\tau_t)_{max}$$

The maximum propagation time $(\tau_t)_{max}$ to be measured is naturally related to the maximum distance to be measured $L_{max}$ by the relationship:

$$(\tau_t)_{max} = 2L_{max}/v$$

where v is the speed of the wave in the propagation medium.

In this case, the accuracy of the measurement is fairly low, for it is difficult to estimate very small phase shifts, especially in the presence of a noise which affects the detected signal and because a phase shift error leads to a distance error all the greater the smaller the pulsation.

To overcome the above drawback, a method, described in the article by D. E. Smith "Electronic distance measurement for industrial and scientific applications" in Hewlett Packard journal, vol. 31, No. 6, June 1980, pages 3-11, Palo Alto, U.S., overcomes the ambiguity by proceeding by successive estimations. For that, several measurements are made successively on signals $S_o, S_1, \ldots S_i,$ and $S_I$ having pulsations $\omega_o, \omega_1, \ldots \omega_i, \ldots$ and $\omega_I$, such that the pulsations $\omega_1, \ldots, \omega_i, \ldots$ and $\omega_I$ are increasing and multiples of the pulsation $\omega_o$. Under these conditions, the last measurement made at the highest pulsation gives the best resolution. But, this implies several successive measurements which take time. In addition, if between two successive measurements the distance to be measured varies too quickly, the result may be erroneous. The present invention aims at overcoming the above drawbacks by providing a method which, in a single measurement, allows the value of the distance to be measured to be obtained without ambiguity, even if it is great, with a resolution equal to that which is obtained in the prior art methods with a high pulsation signal.

SUMMARY OF THE INVENTION

For this, it provides a method of the above defined type, characterized by the fact that:

each period of said modulation signal comprises a succession of elementary signals of equal amplitudes $S_o, S_1, \ldots, S_i, \ldots$ and $S_I$ of durations $T_0, T_1, \ldots, T_i, \ldots$ and $T_I$ respectively, each elementary signal $S_i$ being substantially periodic with a mean pulsation $\omega_i$, the pulsations $\omega_1, \ldots \omega_i, \ldots$ and $\omega_I$ being such that:

$$\omega_i = (2i+1)\omega_o$$

and the times $T_0, T_1, \ldots T_i, \ldots$ and $T_i$ being inversely proportional to the pulsations $\omega_o, \omega_1, \ldots \omega_i, \ldots$ and $\omega_I$ respectively.

each period of said reference signal comprises a succession of elementary signals $S'_o, S'_1, \ldots S'_i, \ldots$ and $S'_I$, each signal $S'_i$ being such that:

$$S'_i = (-1)^i S_i$$

and, said propagation time $\tau_t$ is calculated from the formula $$\tau_t = \tau - \pi/2\,\omega_o$$

In the method of the invention, the pulsation $\omega_o$ of the first elementary signal which the modulation signal comprises is chosen such that $$2\pi/\omega_o > (\tau_t)_{max}$$

which, as in the prior art, overcomes the ambiguity related to the distance. However, the applicant had the idea of searching for, and has found, a modulation signal and a reference signal which, containing the pulsation $\omega_o$ for overcoming the distance ambiguity, are nevertheless such that, in the vicinity of the value of the delay $\tau$ which cancels out the average value of the product of the detected signal and the reference signal, this average value varies very quickly as a function of $\tau$. With the above defined signals, the average values of this product varies substantially rectangularly since it passes from the value $+1$ to the value $-1$ for a variation of $\tau$ corresponding to a quarter of the period of the last elementary signal $S_I$ which the modulation signal comprises. In the method of the invention, a fairly low pulsation $\omega_o$ has therefore been chosen so as to have no ambiguity concerning the maximum distance to be measured, and a fairly high pulsation $\omega_I$ so as to have a good resolution, the result being obtained as a whole in a single measurement.

The invention also provides a device for implementing the above method.

BRIEF DESCRIPTION OF THE DRAWINGS

The invention will be better understood from the following description of the preferred embodiment of the method of the invention in a device for determining a distance by means of an optic wave, or optical telemeter, and the preferred embodiment of this optical telemeter.

The description is made with reference to the accompanying drawings in which.

DESCRIPTION OF THE PREFERRED EMBODIMENTS

Figure 2:
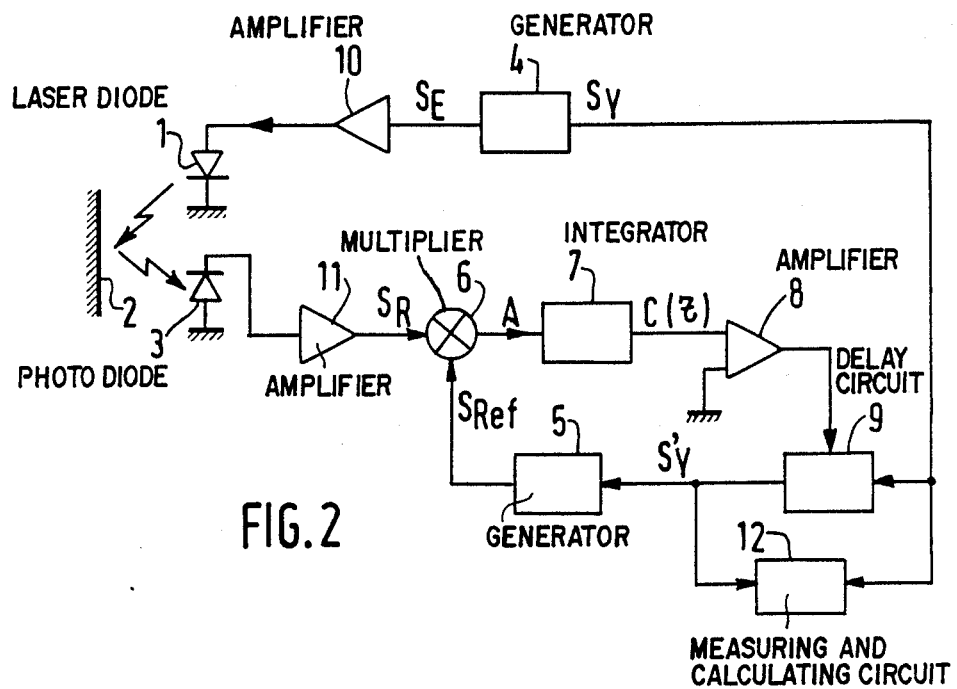
FIG. 2 shows an optical telemeter in accordance with the invention.

Referring to FIG. 2, an optical telemeter for measuring the distance between a transmitter-receiver of an optical wave and a reflecting obstacle 2 comprises:

a laser diode 1 whose transmitted light beam is reflected on the obstacle 2 and is picked up by a photodiode 3, a generator 4 delivering a periodic modulation signal $S_E$ amplified by an amplifier 10 for amplitude modulation of the light beam emitted by the laser diode 1; the first generator 4 delivers also a synchronization signal $S_y$ formed here by a pulse coinciding with the beginning of each period of the modulation signal $S_E$, an amplifier 11, downstream of the photodiode 3 for delivering a detected signal $S_R$ proportional to the amplitude of the wave received by the photodiode 3, a generator 5 delivering a reference signal $S_{Ref}$ synchronized by means of a signal $S'_y$ outputted by a delay circuit 9 whose input receives the synchronization signal $S_y$; the delay circuit 9, which comprises a monostable flip flop, delays the synchronization signal $S_y$ by a time $\tau$, so that the signal $S'_y$ is the delayed synchronization signal, a multiplier 6, here a double-balanced mixer, for working out the product A of the detected signal $S_R$ multiplied by the reference signal $S_{ref}$, followed by the integrator 7 for delivering a signal $C(\tau)$ which is then proportional to the average value of the product of the detected signal $S_R$ and the reference signal $S_{Ref}$, a high gain amplifier 8 amplifying the signal $C(\tau)$ for controlling the width of the output pulse from the monostable flip flop of the delay circuit 9, so for controlling the value of delay $\tau$, a circuit 12 of known type for measuring $\tau$ and calculating $\tau_t$, The operation of the telemeter shown in FIG. 2 is as follows. The wave emitted by diode 1, modulated by the modulation signal $S_E$ propagates as far as the obstacle 2, is reflected and is propagated as far as the photodiode 1. The total propagation time $\tau_t$ is representative of the distance L to be measured between the transmitter-receiver and the obstacle 2 by the relationship $$\tau_t = 2L/C$$

where C is the speed of light in the propagation medium.

The detected signal $S_R$ is delayed by a time $\tau_t$ with respect to the modulation signal $S_E$. In a way known per se, the multiplier 6, integrator 7, amplifier 8, delay circuit 9 and generator 5 form a control loop which, taking into account the high gain of the amplifier 8, permanently ensures the quasi nullity of the signal $C(\tau)$, that is to say the average value of the product of the detected signal $S_R$ and the reference signal $S_{Ref}$. Circuit 12 measures the value of delay $\tau$ and calculates the value of the propagation time $\tau_t$ from the measurement of $\tau$ and from the relationship:

$$\tau_t = \tau - 2\pi/\omega_o$$

Figure 1:
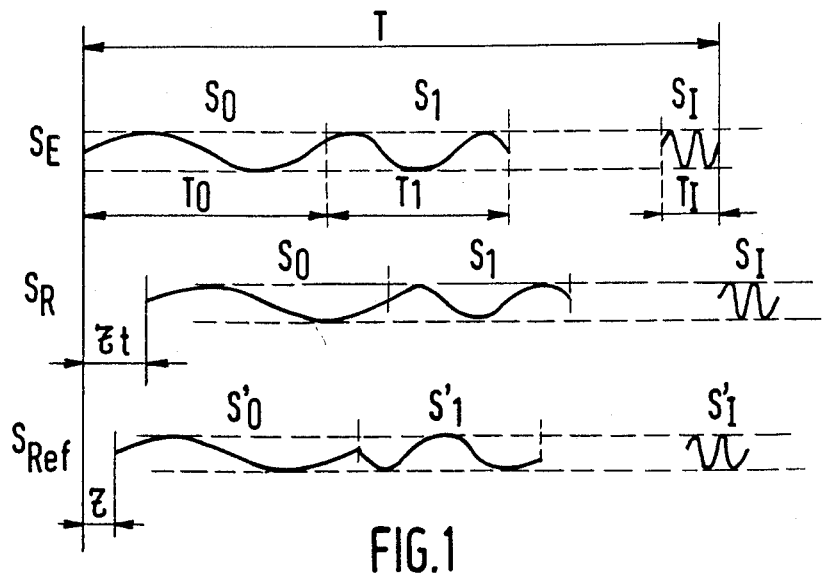
FIG. 1 shows schematically the signals used.

Referring to FIG. 1, the modulation signal $S_E$ is a periodic signal of period T, comprising a succession of elementary signals of equal amplitudes $S_0, S_1, \ldots S_i$, and $S_I$ of duration $T_0, T_1, \ldots T_i, \ldots$ and $T_I$ respectively, each elementary signal $S_i$ being periodic of pulsation $\omega_i$, the pulsations $\omega_1, \ldots, \omega_i, \ldots$ and $\omega_I$ being such that $$\omega_i = (2i+1)\omega_o$$

and the times $T_0, T_1, \ldots, T_i, \ldots$ and $T_I$ being inversely proportional to the pulsations $\omega_o, \omega_1, \ldots \omega_i, \ldots$ and $\omega_I$ respectively.

The pulsation $\omega_o$ is chosen so that:

$$2\pi/\omega_o > (\tau_t)_{max}$$

where $(\tau_t)_{max}$ corresponds to the maximum distance to be measured.

The shortest time $T_I$ is chosen so that $$T_I > (\tau_t)_{max}$$

The reference signal $S_{Ref}$ is a periodic signal of period T, comprising a succession of elementary signals $S'_0, S'_1, \ldots, S'_i \ldots$ and $S'_I$, each signal $S'_i$ being such that:

$$S'_i = (-1)^i S_i$$

Under these conditions, it is possible to show that the average value $C(\tau)$ of the product of the detected signal $S_R$ and the reference signal $S_{Ref}$ is cancelled out for:

$$\tau - \tau_t = \pi/2\omega_o$$

To reach this result, in the expression of the average value:

$$C(\tau) = \frac{1}{2T_f} \int_0^{2T_f} S_R \cdot S_{Ref} \, dt$$

where $T_f$ represents the time constant of the filter of the integrator 7, $S_R$ and $S_{Ref}$ are replaced by their expressions as a function of the elementary signals $S_0, S_1, \ldots S_i, \ldots$ and $S_I$ of the modulation signal $S_E$. In fact, the signal $S_R$ is identical to the signal $S_E$ delayed by time $\tau_t$ and the signal $S_{Ref}$ is identical to the signal $S_E$ delayed by the time $\tau$ and whose elementary components $S_i$ of uneven rank have undergone a phase reversal. It can then be shown that the average value $C(\tau)$ is a quasi rectangular function of $\tau$, that is to say that, when $\tau_t$ is fixed and when $\tau$ varies, the function $C(\tau)$ passes from a value $+1$ to the value $-1$—for a variation of $\tau$ equal to a quarter of the period of the last elementary signal $S_I$, which period may be chosen very small. The value of $\tau$ which corresponds to the correct operation of the control loop is therefore determined with very high precision, like the value of the propagation time $\tau_t$ which is derived from the value of $\tau$.

To reach this result, the applicant had on the one hand the idea of seeking different modulation and reference signals, not having the drawbacks of the single monochromatic signal of the prior art, and, on the other hand, determining these signals by proceeding in a reverse direction to what has been discussed above. Thus it is that the applicant started from a rectangular function $C(\tau)$ and calculated the corresponding modulation signal and reference signal. Thus, he found that the elementary sinusoidal signals, of equal amplitude $S_0, S_1, \ldots, S_i, \ldots$ and $S_I$ defined above could be suitable, but that signals of different amplitudes $A_0, A_1, \ldots A_i, \ldots$ and $A_I$ respectively could also be suitable, provided that the times are modified so that the time $T_i$ of the signal $S_i$ is related to the pulsation $\omega_i$ and to the amplitude $A_i$ of the signal by the relationship:

$$T_i \cdot \omega_i \cdot (A_i)^2 = \text{constant}.$$

Similarly, the applicant showed that instead of the elementary sinusoidal signals, elementary rectangular signals could be used which are substantially periodic, of a mean pulsation equal to the preceding instantaneous pulsation. This simplifies the circuits, by allowing for example an exclusive OR gate to be used as multiplier.

Figure 3:
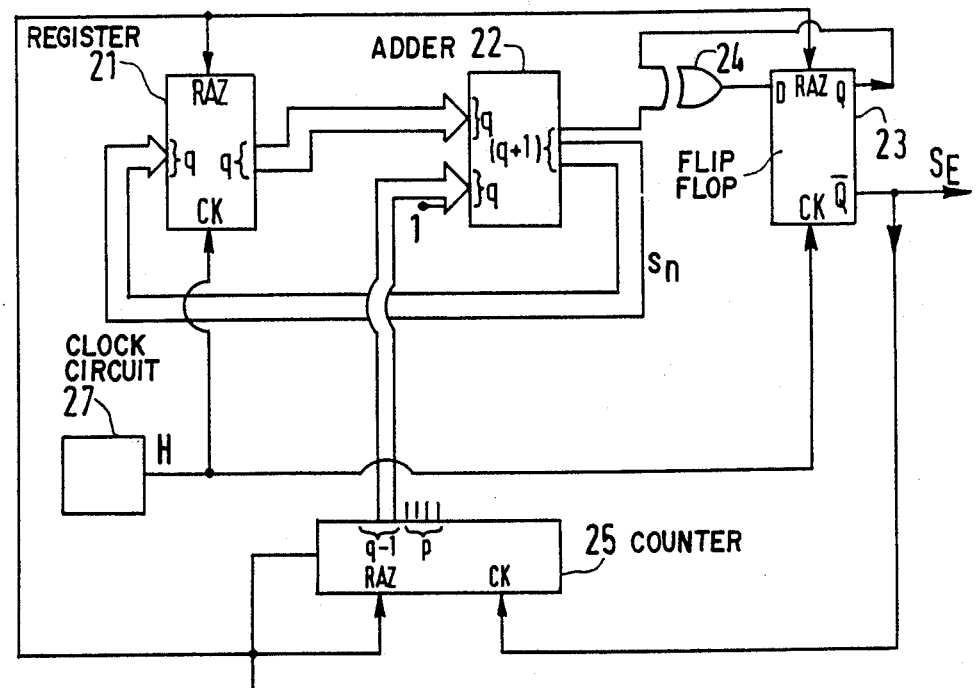
FIG. 3 shows the modulation signal generator of the telemeter of FIG. 2.

In this case, the generator 4 of the modulation signal $S_E$ comprises, referrring to FIG. 3:

a digital adder 22 having a first parallel input with q bits, a second parallel input with q bits and an output with (q+1) bits, the least significant q bits of said output of adder 22 being applied to said first input of the adder 22 through a register 21 having a parallel q bits input, a parallel q bits output, a clock input and a reset input, an exclusive OR gate 24 having a first input receiving the remaining most significant bit of said output of adder 22, a second input, and an output, a flip flop 23 having a D input connected to said output of said gate 24, a clock input, a reset input, a Q output connected to said second input of said gate 24 and a $\overline{Q}$ output delivering the modulation signal $S_E$, a counter 25 having a capacity of (p+q−1), having a clock input connected to said $\overline{Q}$ output of said flip flop 23, a reset input, and a parallel output whose (q−1) most significant bits are connected to the (q−1) most significant bits of said second input of said adder 22, whose remaining least significant bit permanently receives a level 1, and an overflow output connected to said reset inputs of said register 21, of said flip flop 23 and of said counter 25, said overflow output delivering said synchronization signal $S_y$, a clock circuit 27 having an output, delivering a signal H of period $T_H$, connected to said clock input of said register 21 and said flip flop 23.

The generator 4 operates in the following way. After each overflow of counter 25, this latter, as well as register 21 and flip flop 23, are reset. If we call $s_n$ the signal at the input of register 21 at the time of the nth pulse from clock 27 following a reset, we have $$s_n = s_{n-1} + 1$$

since the signal $s_{n-1}$ is applied to the first input of adder 22 and since, for the time being, with the output of counter 25 at zero, the second input of the adder is at 1. The signal $s_n$ increases then by a unit per clock period $T_H$. Whenever it reaches the value $(2^q-1)$ the flip flop 23 changes state for the most significant bit of the output of adder 22 passes to level 1 and controls, through gate 24, the change of state of flip flop 23. One change of state—out two is counted by the counter 25. As long as the output of counter 25 has not reached the value of $(2^p+1)$, the rate of variation of $s_n$ is unchanged. The modulation signal $S_E$ is therefore a periodic rectangular signal of frequency $f_o$ such that:

$$1/f_o = 2 \cdot 2^q \cdot T_H$$

and of duration $$T_o = 2^{p+1}(1/f_o) = 2^{p+q+2} \cdot T_H$$

At the end of the time $T_0$, the bit of rank p+1 of the output of counter 25 passes to 1, and the value applied to the second input of adder 22 passes to 3; The signal $s_n$ follows the law:

$$s_n = s_{n-1} + 3$$

and increases by 3 units per clock period $T_H$.

Flip flop 23 always changes state when the signal $s_n$ exceeds the value $(2^q-1)$. Therefore the modulation signal $S_E$ is a substantially periodic rectangular signal (because it does not necessarily pass through th value $(2^q-1)$ of mean frequency $f_1$ such that:

$$1/f_1 = 2 \cdot (2^q/3) \cdot T_H = \tfrac{1}{3} f_o$$

and of duration $$T_1 = 2^{p+1}(1/f_1) = 2^{p+q+2} \cdot T_H/3$$

Figure 4:
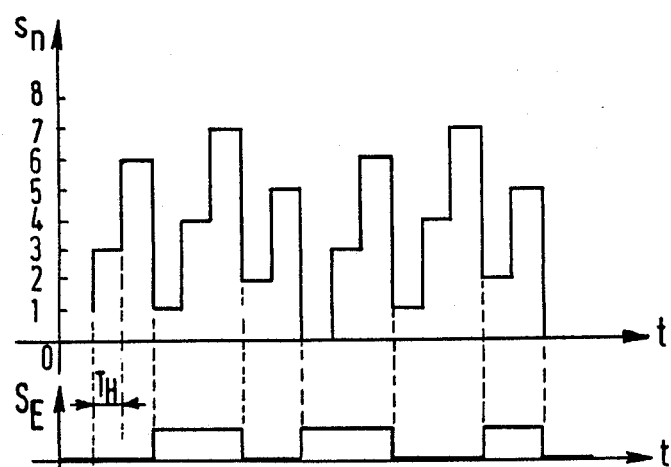
FIG. 4 is a timing diagram of the operation of the modulation signal generator of FIG. 3.

FIG. 4 shows the evolution of $s_n$ and $S_E$ in time, in the case where q=3 and so $$2^q - 1 = 7$$

It is easy to show that the modulation signal $S_E$ will thus comprise a succession of elementary signals $S_0, S_1, \ldots S_i, \ldots$ and $S_I$, the frequency $f_i$ of the signal $S_i$ being such that:

$$f_i = (2i+1) \cdot f_o$$

and the duration $T_i$ of the signal being:

$$T_i = T_0/(2i+1)$$

so inversely proportional to the frequency $f_i$.

The last signal $S_i$ in the one which precedes overflowing of the counter 25, corresponding to the general resetting and to the synchronization pulse of signal $S_y$, after which a new period T of the modulation signal $S_E$ begins.

Figure 5:
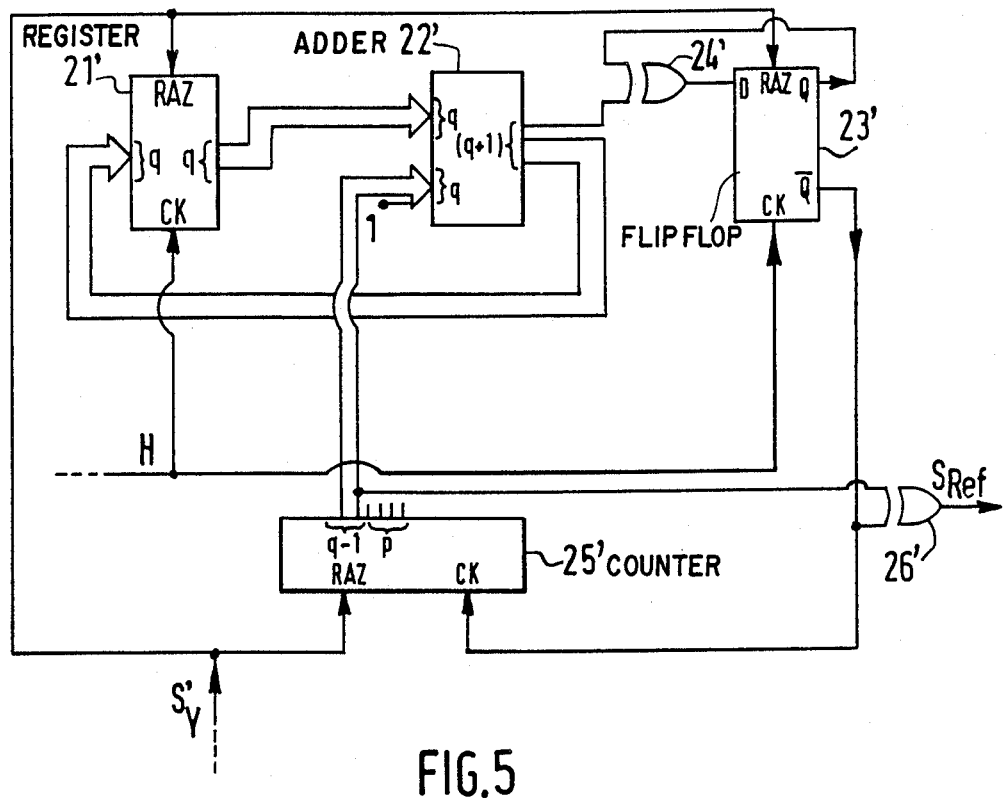
FIG. 5 shows the reference signal generator of the telemeter of FIG. 2.

The reference signal generator 5 is shown in FIG. 5. It comprises the same elements as the modulation signal generator 4, which will therefore not be described a second time, and the operation of this generator is the same as that for generator 4. However, since this generator must be synchronized by the synchronization signal $S'_y$, the overflow output of counter 25' is not connected to the reset inputs, which on the other hand receive the signal $S'_y$. Furthermore, to ensure the phase reversal of the elementary signals $S_i$ of uneven rank, the output of signal $S_{Ref}$ is made after an exclusive OR gate 26', a first input of which is connected to the bit of rank p+1 of the output of the counter 25' and the second output of which is connected to the $\overline{Q}$ output of flip flop 23'. The clock signal H of register 21' and of flip flop 23' is the one delivered by the clock 27 of the generator 4.

The other constituent elements of the telemeter are conventional circuits well known to a man versed in the art.

The method of the invention applies to all devices where it is necessary to modulate a wave and measure phase shift times, such for example as altimeters.

The method of the invention may be used equally well with all types of waves and may find applications in the radio, acoustic and optical fields.

What is claimed is:

1. A method of measuring the propagation time $\tau_t$ of a wave between a transmitter-receiver of said wave and a reflecting obstacle, said method comprising:

amplitude modulating said wave by means of a periodic modulation signal,
   transmitting said wave,
   detecting an amplitude of said wave after propagation, reflection off said obstacle and reception by said transmitter-receiver, to obtain a detected signal,
   generating a periodic reference signal which has a same period as said modulation signal and is phase shifted with respect thereto by a phase shift corresponding to a delay time $\tau$,
   calculating an average value of the product of said detected signal and said reference signal,
   controlling said phase shift so that said average value is zero, and
   calculating said propagation time $\tau_t$ from the delay time $\tau$ thus obtained,
   each period of said modulation signal comprising a succession of elementary signals of equal amplitudes $S_0, S_1, \ldots, S_i, \ldots$ and $S_I$ of times $T_0, T_1, \ldots, T_i, \ldots$ and $T_I$ respectively, each elementary signal $S_i$ being substantially periodic of mean pulsation $\omega_i$, the pulsations $\omega_1, \ldots \omega_i, \ldots$ and $\omega_I$ being such that:

$$\omega_i = (2i+1)\omega_0$$

and the times $T_0, T_1, \ldots T_i, \ldots$ and $T_I$ being inversely proportional to the pulsations $\omega_0, \omega_1, \ldots \omega_i,$ and $\omega_I$ respectively,
   each period of said reference signal comprising a succession of elementary signals $S'_0, S'_1, \ldots, S'_i, \ldots$ and $S'_I$, each signal $S'_i$ being such that:

$$S'_i = (-1)^i S_i, \text{ and}$$

said propagation time $\tau_t$ is calculated from the formula $$\tau_t = \tau - \pi/2\omega_0.$$

2. A device for measuring the propagation time $\tau_t$ of a wave between a transmitter-receiver of this wave and a reflecting obstacle, comprising:

first means for generating a periodic modulation signal,
   means receiving said modulation signal for emitting a wave having its amplitude modulated by said modulation signal
   means receiving said wave after propagation and reflection off said obstacle for detecting its amplitude and delivering a detected signal,
   second means for generating a periodic reference signal having a same period as said modulation signal and phase shifted with respect thereto by a phase shift corresponding to a delay time $\tau$,
   means for calculating the average value of the product of said detected signal and said reference signal,
   means for controlling said phase shift so that said average value is zero, and
   means for calculating said propagation time $\tau_t$ from the delay time $\tau$ thus obtained,
   said first generator means being arranged so that each period of said modulation signal comprises a succession of elementary signals of equal amplitudes $S_0, S_1, \ldots, S_i, \ldots$ and $S_I$ of times $T_0, T_1, \ldots, T_i, \ldots$ and $T_I$ respectively, each elementary signal $S_i$ being substantially periodic of mean pulsation i, the pulsations $\omega_1, \ldots, \omega_i, \ldots$ and $\omega_I$ being such that:

$$\omega_i = (2i+1)\omega_0$$

and the times $T_0, T_1, \ldots T_i, \ldots$ and $T_I$ being inversely proportional to the pulsations $\omega_0, \omega_1, \ldots,$ and $\omega_i$ and $\omega_I$ respectively, said first generator means further delivering a synchronization signal at the beginning of each period of said modulation signal,
   said second generator means comprising means, receiving said synchronization signal, for delaying it by said delay time and third means, synchronized by the delayed synchronization signal, for generating a succession of elementary signals $S'_0, S'_i, \ldots$ and $S'_I$, each signal $S'_i$ being such that:

$$S'_i = (-1)^i S_i$$

said calculating means being adapted to calculate the propagation time $\tau_t$ from the formula:

$$\tau_t = \tau - \pi/2\omega_0.$$

3. The device as claimed in claim 2, wherein said first generator means comprise:
   a digital adder having a first parallel q bits input, a second parallel q bits input and a (q30 1) bits output, the q least significant bits of said output of the adder being applied to said first input of the adder through a register having a parallel q bits inputs, a parallel q bit output, a clock input and a reset input,
   an exclusive OR gate having a first input receiving the remaining most significant bit of said output of the adder, a second input and an output,
   a flip flop having a D input connected to said output of said gate, a clock input, a reset input, a Q output connected to said second input of said gate and a $\overline{Q}$ output delivering said modulation signal,
   a counter having a capacity of $(p+q-1)$ bits, having a clock input connected to said $\overline{Q}$ output of said flip flop, a reset input and a parallel output whose $(q-1)$ most significant bits are connected to the ($q-1$) most significant bits of said second input of said adder, whose remaining least significant bit permanently receives a level 1, and an overflow output connected to said reset input of said register, of said flip flop and of said counter, said overflow output delivering said synchronization signal, a clock circuit having an output connected to said clock inputs of said register and of said flip flop.

4. The device as claimed in one of claims 2 or 3, wherein said third means comprise:

a digital adder having a first parallel q bits input, a second parallel q bits input and a ($q+1$) bits output, said q least significant bits of said output of the adder being applied to said first input of the adder through a register having a parallel q bits input, a parallel q bits output, a clock input and a reset input, an exclusive OR gate having a first input receiving the remaining most significant bit of said output of the adder, a second input and an output, a flip flop havig a D input connected to said output of said gate, a clock input, a reset input, a Q output connected to said second input of said gate and a $\overline{Q}$ output, a counter having a capacity of ($p+q-1$) bits, with a clock input connected to said $\overline{Q}$ output of said flip flop, a parallel output whose ($q-1$) most significant bits are connected to the ($q-1$) most significant bits of said second input of said adder, whose remaining least significant bit permanently receives a level 1, and a reset input connected to said reset inputs of said register and of said flip flop and receiving said delayed synchronization signal, said clock inputs of said register and of said flip flop being connected to the output of said clock circuit, and an exclusive OR gate having a first input connected to the bit of rank ($p+1$) of the output of said counter, a second input connected to the $\overline{Q}$ output of said flip flop and an output delivering said reference signal.

* * * * *